United States Patent
Farr et al.

(10) Patent No.: US 9,235,048 B2
(45) Date of Patent: Jan. 12, 2016

(54) MARINE ENVIRONMENT ANTIFOULING SYSTEM AND METHODS

(71) Applicant: Woods Hole Oceanographic Institution, Woods Hole, MA (US)

(72) Inventors: Norman Erwin Farr, Woods Hole, MA (US); Clifford Thomas Pontbriand, North Falmouth, MA (US); Timothy Goodwin Peters, Falmouth, MA (US)

(73) Assignee: WOODS HOLE OCEANOGRAPHIC INSTITUTION, Woods Hole, MA (US)

( * ) Notice: Subject to any disclaimer, the term of this patent is extended or adjusted under 35 U.S.C. 154(b) by 97 days.

(21) Appl. No.: 13/940,814

(22) Filed: Jul. 12, 2013

(65) Prior Publication Data

US 2014/0078584 A1    Mar. 20, 2014

Related U.S. Application Data

(60) Provisional application No. 61/671,426, filed on Jul. 13, 2012.

(51) Int. Cl.
| | | |
|---|---|---|
| *G02B 27/00* | (2006.01) | |
| *B08B 7/00* | (2006.01) | |
| *B63B 59/04* | (2006.01) | |
| *B63B 59/08* | (2006.01) | |
| *G02B 23/22* | (2006.01) | |

(52) U.S. Cl.
CPC ............ *G02B 27/0006* (2013.01); *B63B 59/04* (2013.01); *B63B 59/08* (2013.01); *G02B 23/22* (2013.01); *B08B 7/0057* (2013.01)

(58) Field of Classification Search
CPC .... G02B 27/0006; G02B 1/115; G02B 23/22; F21V 21/00; B63B 59/04; B63B 59/045; B63B 59/08; B63B 59/082
USPC .......................................... 359/507
See application file for complete search history.

(56) References Cited

U.S. PATENT DOCUMENTS

| | | | |
|---|---|---|---|
| 3,418,138 | A | 12/1968 | Dennis et al. |
| 3,500,041 | A | 3/1970 | Kassing |
| 4,297,222 | A | 10/1981 | Takeguchi et al. |
| 4,320,085 | A | 3/1982 | Takeguchi et al. |
| 5,308,505 | A | 5/1994 | Titus et al. |
| 5,322,569 | A | 6/1994 | Titus et al. |

(Continued)

FOREIGN PATENT DOCUMENTS

| | | |
|---|---|---|
| DE | 2617027 | 10/1977 |
| JP | 5675290 | 6/1981 |

(Continued)

OTHER PUBLICATIONS

International Search Report and Written Opinion for PCT/US2013/050318 mailed Nov. 6, 2013 (12 pages).

*Primary Examiner* — Bumsuk Won
*Assistant Examiner* — Ephrem Mebrahtu
(74) *Attorney, Agent, or Firm* — Douglas Denninger

(57) ABSTRACT

The present invention relates to systems and methods for reducing fouling of a surface of an optically transparent element with a light source. According to one aspect, the invention is a system including an LED for emitting UV-C radiation, a mount for directing emitted UV-C radiation toward the optically transparent element, and control circuitry for driving the LED. The system may be used to remove a desired amount of biofilm.

14 Claims, 5 Drawing Sheets

(56) References Cited

U.S. PATENT DOCUMENTS

| | | |
|---|---|---|
| 5,660,719 A | 8/1997 | Kurtz et al. |
| 6,475,433 B2 | 11/2002 | McGeorge et al. |
| 6,483,119 B1 | 11/2002 | Baus |
| 6,565,757 B1 | 5/2003 | Wedkamp |
| 7,341,695 B1 | 3/2008 | Garner |
| 7,953,326 B2 | 5/2011 | Farr et al. |
| 2001/0053332 A1 | 12/2001 | Omasa |
| 2002/0030011 A1 | 3/2002 | Constantine et al. |
| 2002/0100679 A1 | 8/2002 | Wedekamp |
| 2003/0047518 A1 | 3/2003 | Heidal et al. |
| 2004/0007538 A1 | 1/2004 | Siriphraiwan |
| 2006/0011558 A1 | 1/2006 | Fencl et al. |
| 2007/0115672 A1* | 5/2007 | Nelson et al. ................. 362/396 |
| 2010/0006036 A1 | 1/2010 | Ochoa Disselkoen |
| 2010/0176056 A1 | 7/2010 | Rozenberg |
| 2010/0224562 A1 | 9/2010 | Rolchigo et al. |
| 2012/0050520 A1* | 3/2012 | Thoren et al. ................... 348/81 |

FOREIGN PATENT DOCUMENTS

| | | |
|---|---|---|
| WO | WO-0079246 A1 | 12/2000 |
| WO | WO-03016222 A1 | 2/2003 |
| WO | WO-03034817 A1 | 5/2003 |
| WO | WO-2004002895 A2 | 1/2004 |
| WO | WO-2010022057 A1 | 2/2010 |
| WO | WO-2011049277 A1 | 4/2011 |

\* cited by examiner

MARINE ENVIRONMENT ANTIFOULING SYSTEM AND METHODS

RELATED APPLICATIONS

This application claims priority to and the benefit of U.S. Provisional Patent Application Ser. No. 61/671,426 filed on Jul. 13, 2012, the disclosure of which is hereby incorporated herein by reference in its entirety.

STATEMENT REGARDING FEDERALLY SPONSORED RESEARCH OR DEVELOPMENT

Federal funds awarded by the National Science Foundation under Grant Nos. OCE-0942835 and OCE-0737958 contributed to making this invention. The U.S. Government has certain rights herein.

FIELD OF THE INVENTION

The present invention relates generally to antifouling systems and, more specifically, to antifouling systems operating in situ with an LED light source.

BACKGROUND OF THE INVENTION

The growth and feeding of biofouling organisms (e.g., forming a hard substrate community) inhibits the operational characteristics of industrial objects, such as lenses. Several approaches are used to address this problem, including using coatings. However, in many circumstances a coating will not work. For example, windows of a submerged precision optical instrument cannot be coated due to concerns with obstructing the clarity of the windows, thereby affecting the instrument's measurements. Another approach is to remove the organisms manually, e.g., by scrubbing wiping akin to a windshield wiper, but the use of mechanical components can increase the opportunities for failure and introduce additional complexity and cost into the system.

Maintaining an uncompromised visual connection through the window is particularly important in many communications systems. For example, scientists are deploying unmanned underwater vehicles (UUV) that, due to their mobility, can expand the reach of seafloor observatories. These UUVs typically carry sensors on-board and operate autonomously, carrying out pre-programmed missions. While certain types of UUVs are tethered by cable to the seafloor observatories, the tethered UUVs have a short range of motion and are limited by the length of the tether. Scientists are also deploying un-tethered UUVs which may be controlled wirelessly by an acoustic communication system or an optical communication system. Acoustic communication systems, however, tend to be limited by low bandwidth and high latency, and do not permit video or other high-rate data transfers.

Accordingly, there is a need to provide an antifouling device that prevents and/or removes organisms from a surface in a marine environment. There is also a need for such a device to remove the organisms from a window while maintaining the integrity of the window for accurate sensor readings and communications.

SUMMARY OF THE INVENTION

The present invention relates to systems and methods for reducing fouling of a surface of an optically transparent element with a light source. By using LEDs, such a system may be more efficient, have a longer lifetime, and be more compact than traditional systems. The systems and methods may be further augmented by varying wavelengths and duty cycle.

According to one aspect, the invention relates to a system for reducing fouling of a surface of an optically transparent element subjected to a marine environment. The system includes an LED for emitting UV-C radiation, a mount for directing emitted UV-C radiation toward the optically transparent element, and control circuitry for driving the LED.

In accordance with one embodiment of the above aspect, the optically transparent element is a window or a lens. The emitted UV-C radiation may have a wavelength between about 265 nm and about 295 nm. The mount may be disposed on a side of the optically transparent element proximate the surface. The LED may be disposed in a watertight enclosure, which may have a UV transparent port. In other embodiments, the mount may be disposed on a side of the optically transparent element remote from the surface, and the optically transparent element may be made of a UV transparent material. In additional embodiments, the control circuitry is adapted to maintain a constant duty cycle of the LED, which may be at least about 10%. An attenuated dosage reaching the surface may be at least about 0.5 kJ/m$^2$. A kill efficiency at the surface may be at least about 95%.

In another aspect, the invention relates to a method for reducing fouling of a surface of an optically transparent element subjected to a marine environment. The method includes providing an LED source for emitting UV-C radiation, driving the LED source to emit UV-C radiation, and directing emitted UV-C radiation toward the optically transparent element.

In accordance with one embodiment of the foregoing aspect, the optically transparent element is a window or a lens. The emitted UV-C radiation may have a wavelength between about 265 nm and about 295 nm. In some embodiments, the emitted UV-C radiation is directed on a side of the optically transparent element proximate the surface. The LED may be disposed in a watertight enclosure, which may have a UV transparent port. In other embodiments, the emitted UV-C radiation is directed on a side of the optically transparent element remote from the surface. The optically transparent element may be made of a UV transparent material. The LED may be driven to maintain a constant duty cycle, which may be at least about 10%. In additional embodiments, an attenuated dosage reaching the surface is at least about 0.5 kJ/m$^2$. A kill efficiency at the surface may be at least about 95%.

BRIEF DESCRIPTION OF THE FIGURES

Other features and advantages of the present invention, as well as the invention itself, can be more fully understood from the following description of the various embodiments, when read together with the accompanying drawings, in which.

DETAILED DESCRIPTION OF THE INVENTION

The invention may be better understood by reference to the following detailed description, taken in conjunction with the figures. Various embodiments of the invention relate to a system for eliminating biofilm on a surface. Other configurations and variants will be apparent to those skilled in the art from the teachings herein.

Figure 1A:
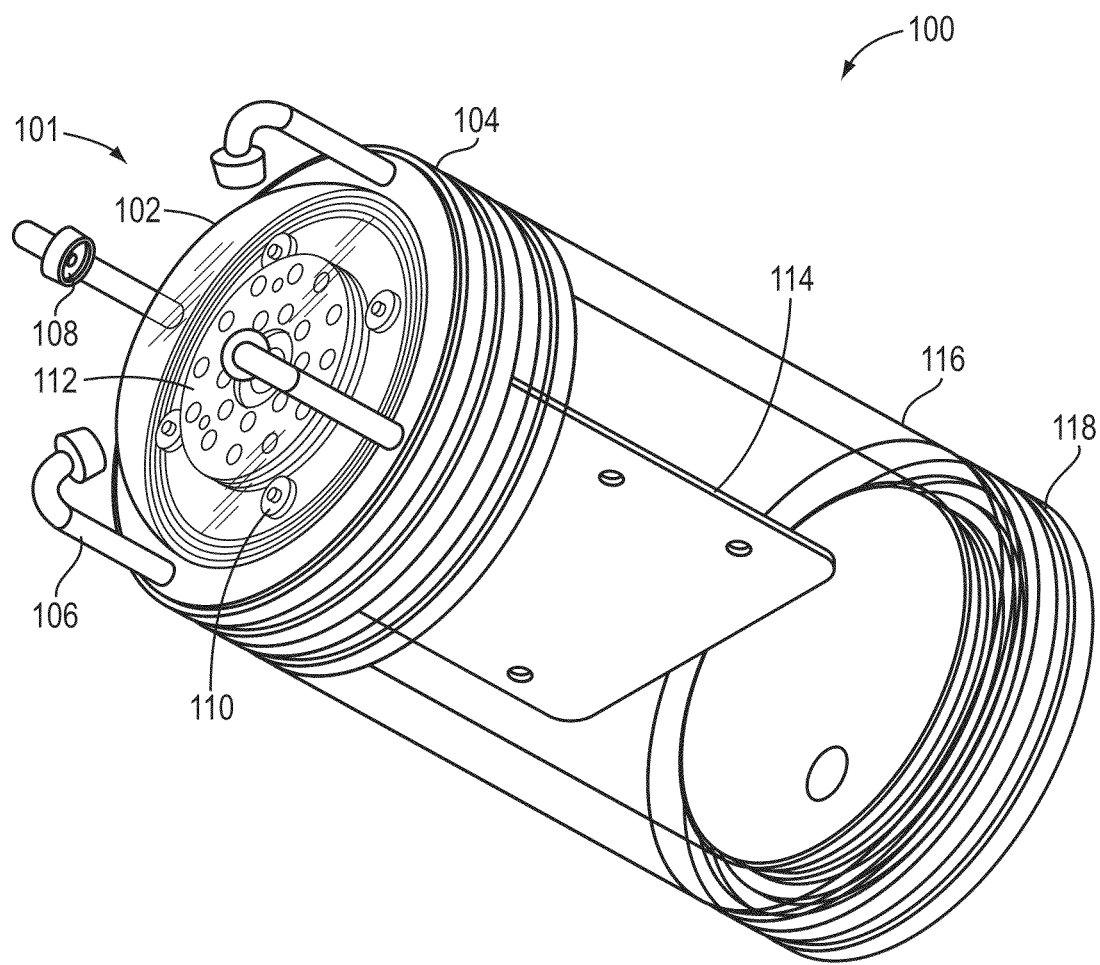
FIG. 1A is a schematic, perspective, semi-transparent view of an optical modem, in accordance with one embodiment of the invention.

FIG. 1A depicts an optical modem (or transmitter assembly) 100 with a system 101 for reducing fouling of a surface of an optically transparent element 102 in a marine environment. The outer surface of the optically transparent element may be in contact with marine fluid, making this surface particularly vulnerable to developing biofilm that supports larger organism bio-fouling. The system 101 may be configured to remove/prevent the formation of biofilm. The optically transparent element 102 allows for the transmission of light therethrough, enabling communications and sensors reliant on optics to operate within the interior of the optical modem 100, but which can be obstructed through the formation of biofilm and related organisms. Embodiments of this invention are suitable for use with various systems and methods of optically communicating underwater, including those described in U.S. Pat. No. 7,953,326, which is hereby incorporated herein in its entirety.

Figure 1B:
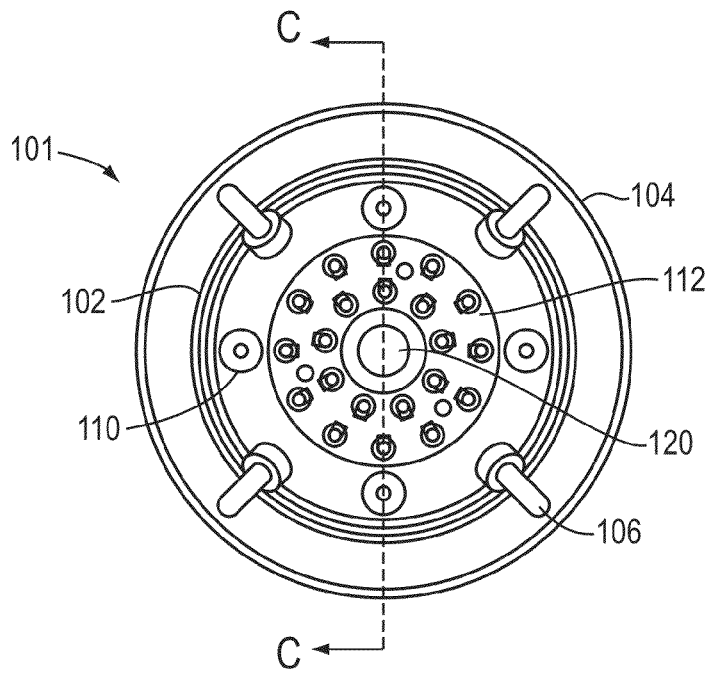
FIG. 1B is a schematic plan view of the optical modem of FIG. 1A.

The optically transparent element 102 may be located on an end cap 104 of the optical modem 100. The optically transparent element 102 can take many different forms, including a window or a lens (e.g., flat or curved). The end cap 104 may include one or more mounts 106 extending from an upper side thereof. These mounts 106 may be disposed near the periphery of the end cap 104, as depicted in FIG. 1B. The mounts 106 may be adapted to house an ultraviolet (UV, including UV-C) light-emitting diode (LED) 108 at a distal end thereof, such as within a watertight enclosure to protect the LEDs 108 from the surrounding marine fluid. These LEDs 108 may provide light in a variety of wavelengths, including wavelengths from about 265 nm to about 295 nm, though greater and lesser wavelengths may be produced, as well. The enclosure may have a UV transparent port so that UV light from the LEDs 108 may pass through the enclosure to the optically transparent element 102. The mounts 106 may be configured to direct emitted UV-C radiation from the LEDs 108 toward the optically transparent element 102, for example, by angling the distal end of the mounts 106 with the LEDs 108 inward and downward toward the optically transparent element 102. With the mounts 106 and the LEDs 108 on the exterior of the optically transparent element 102 (i.e., in the marine fluid), they are proximate the surface to be irradiated. The LEDs 108 may be used alone or in conjunction with others, as described below.

In certain embodiments, LEDs 110 may be mounted on an interior of the optically transparent element 102, remote from the surface to be irradiated, requiring any light intended to reach the surface to first pass through the material of the optically transparent element 102. To allow UV radiation to reach the surface, the optically transparent element 102 may be made of a UV transparent material. The interior LEDs 110 may be used alone or in conjunction with the exterior LEDs 108.

Figure 2:
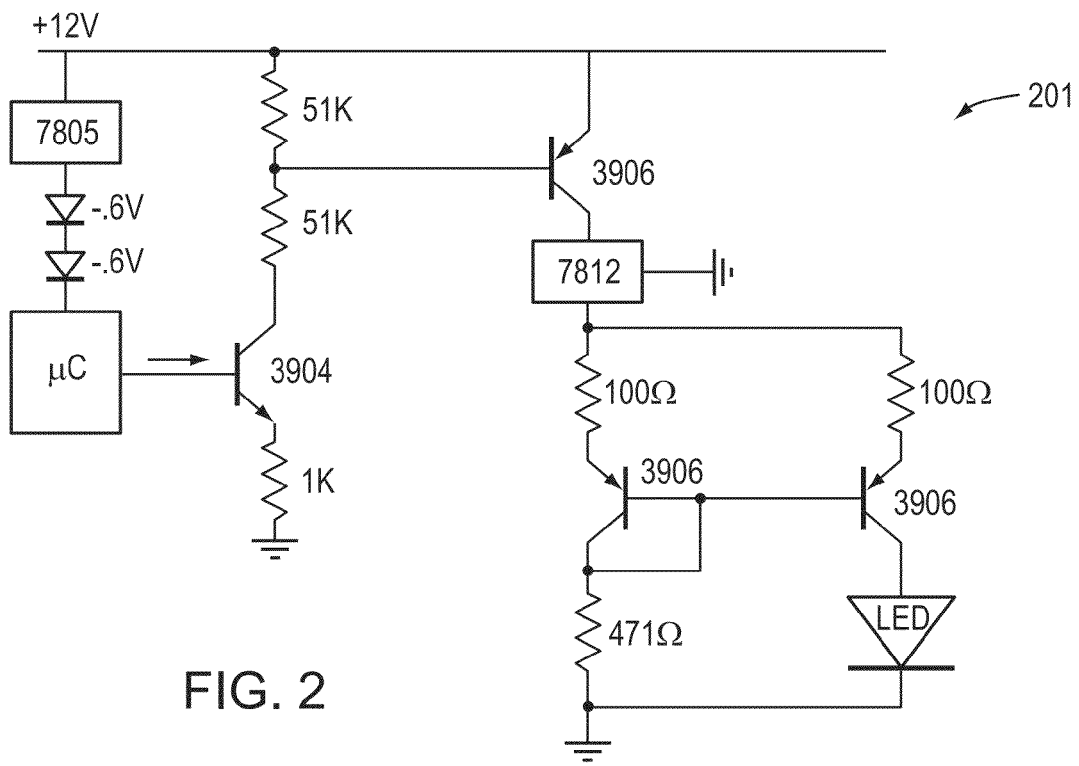
FIG. 2 is a schematic diagram of a timer circuit for use with the optical modem of FIG. 1A, in accordance with one embodiment of the invention.

The LEDs 108, 110 may be controlled by a timer/driver circuit 201, as depicted in FIG. 2. The control circuit 201 may control the duty cycle of the LEDs 108, allowing a user to control the period of time the LEDs 108, 110 are on (and thus when they are off). The circuit 201 may maintain a constant duty cycle of the LEDs 108, 110 for a period of time, e.g., 80 minutes on and 12 hours off. The duty cycle may be set to any period of time, including at least about 10% of on time compared to total time. The system 101 may be configured to dose the surface with a predetermined amount of light energy and density (e.g., about 0.5 kJ/m$^2$) and/or to achieve a desired kill efficiency (e.g., at least about 95%).

Figure 1C:
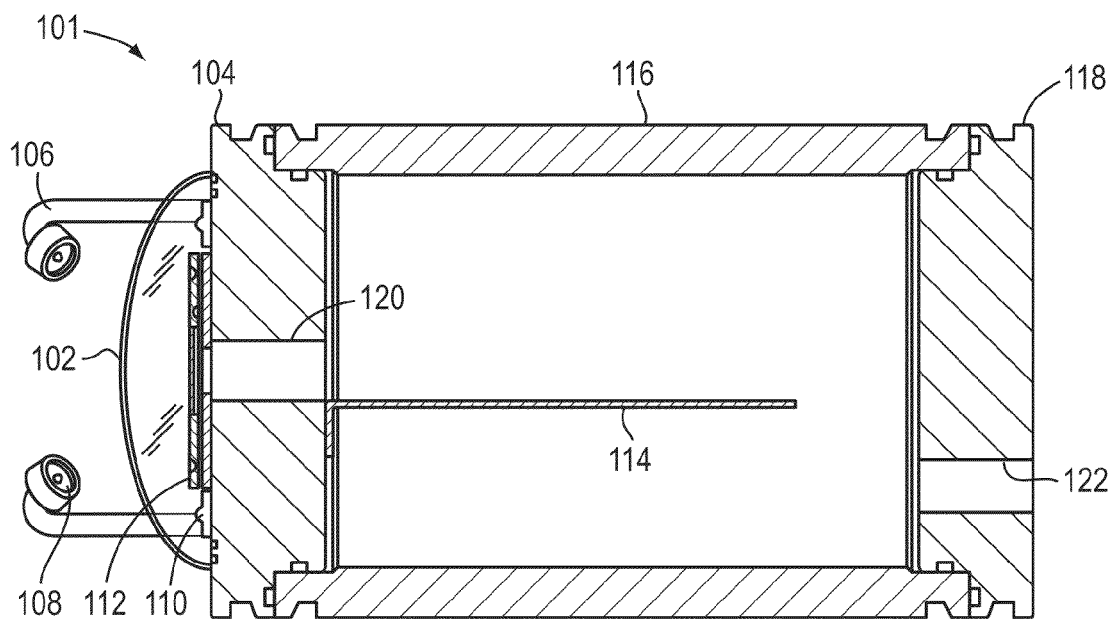
FIG. 1C is a schematic cross-sectional view of the optical modem of FIG. 1A taken along line C-C in FIG. 1B.

A light emitting array 112 may be used to communicate with another optical device. In some embodiments, the array may be a receiver instead of, or in addition to, being an emitter, and may replace the light emitting array 112 referred to throughout the specification. The various embodiments of the array may be used for transmitting or receiving optical signals. The electronics controlling the LEDs 108, 110 and/or the electronics controlling the light emitting array 112 may be located on a mounting flange 114 extending from a lower side of the end cap 104. The mounting flange 114 may be protected from the exterior environment by a housing 116 and an additional end cap 118. Each of the end caps 104, 118 may have a bore 120, 122 respectively formed therethrough to provide passage into the optical modem 100, such as for electrical wiring, as depicted in FIG. 1C. If necessary, these bores 120, 122 may be covered or sealed to preclude introduction of marine fluid into the housing 116.

To use the system 101, the user may pre-program a control circuit 201 to drive the LEDs 108, 110 to emit UV-C radiation. This may be done on a set schedule, as part of a constant duty cycle, or on demand. When an appropriate amount and type of UV-C radiation is directed toward the optically transparent element 102, biofilm formed thereon is removed.

Figure 3:
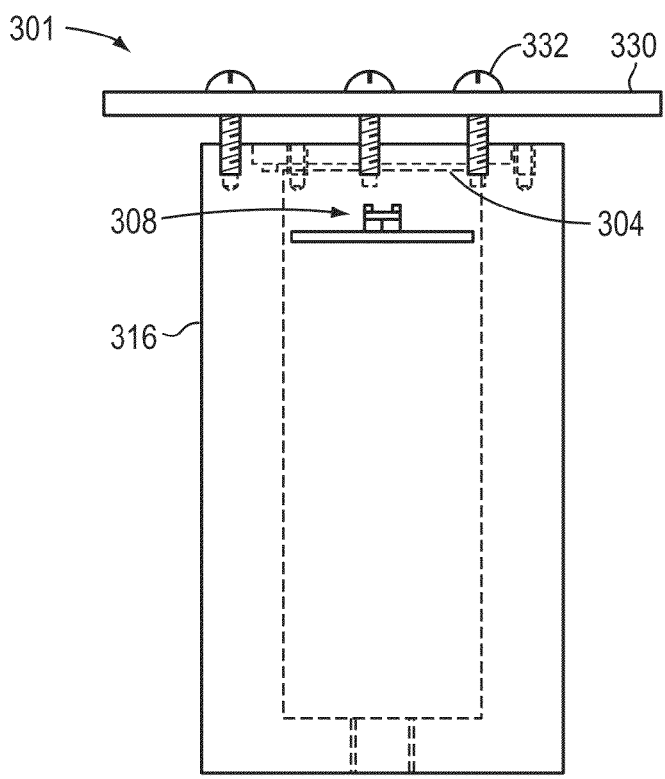
FIG. 3 is a schematic side view of an experimental setup for testing the effectiveness of UV LEDs, in accordance with one embodiment of the invention.

FIG. 3 depicts an experimental setup 301 for comparing the effects of two separate wavelengths of deep UV LEDs on the growth of biofilms. The purpose of the experiment was to assess the effectiveness of both 265 nm and 295 nm UV LEDs for the purpose of eliminating the primary biofilm that supports larger, obtrusive biofouling on an underwater substrate or window. This experiment was intended to test LEDs as sources of deep UV, as well as to determine the threshold dosages required to prevent fouling. Previous tests disclosed that high doses of ~260 nm UV emitted from lamps would keep a substrate sufficiently clear. LEDs are of particular interest due to their efficiency, long lifetime (when driven properly), and compact size.

The experimental setup 301 includes an LED 308 (one 265 nm LED and one 295 nm LED in separate assemblies), a housing 316 with a window 304 for the LED 308 to project through, and a substrate 330 mounted to the housing with connectors 332. Also included, but not depicted, are a timer circuit, a current driver circuit, a power supply, underwater cable connectors, Subconn MCIL2M connectors, general radio connectors, and 5"×8" enclosures.

The common timer circuit was programmed to a predetermined duty cycle (i.e., 80 minutes on, 12 hours off). The housings 316, one containing a 265 nm LED and the other a 295 nm LED (both with individual driver circuits), were sealed by screwing on their respective Lexan™ substrates 330a, 330b (SABIC Innovative Plastics; Pittsfield, Mass.). The housings 316 were then connected to their respective cables, and dangled underwater approximately 1 m below the low-tide line for optimal sunlight and constant submersion. The cables were then connected to the LED timer circuit, powered by a 12V DC power supply. The date and time were noted, and the substrates 330a, 330b were left to be fouled. Every few days, the housings 316 were recovered and the substrates 330a, 330b were removed without disturbing any potential growth. The underside of each substrate 330a, 330b was then studied for signs of growth and photographed (see FIGS. 4A-4E). The substrates 330a, 330b were reinstalled and the housings 316 were again submerged. This process was repeated until the amount of accumulated biofouling indicated that the current duty cycle was less or more than adequate, ordinarily a period of four weeks.

The first test configuration, with a duty cycle of 20 min on and 12 hr off (2.5%), was insufficient for antifouling purposes. Growth on both substrates 330a, 330b was reduced within the irradiated radii, but not completely. After two weeks, barnacles had appeared on the windows 304 of both housings 316, a clear sign of inadequate dosage.

The second test configuration, with a duty cycle doubled to 40 min on and 12 hr off (5%), yielded interesting results. While the substrate 330a radiated with 265 nm UV showed little improvement with the doubling of dosages, the more powerful yet less effective 295 nm LED 308 was much more successful. A slight biofilm did form on the 295 nm substrate 330b within its irradiated radius, but it was clearly more effective than the 265 nm, lower-power LED 308. Neither window 304 supported any kind of growth.

A third test configuration, as indicated in Table 1, was configured with a duty cycle of 80 min on and 12 hr off (10%). This time, both substrates 330a, 330b were kept completely clear of fouling, and there was no discernible difference between the effects of the two wavelengths of LEDs 308.

TABLE 1

LED Configuration for Dataset #3

| λ (nm) | Kill Efficiency | $P_o$ (µW) | Duty Cycle | Dosage (kJ/m2)* | Worst-Case Attenuated Dosage (kJ/m2) |
|---|---|---|---|---|---|
| 265 | 95% | 300 | 80 min ON 12 hr OFF | 1.37 | 0.49 |
| 295 | 25% | 500 | 80 min ON 12 hr OFF | 2.29 | 0.82 |

*Research suggests that 0.5 kJ/m2 will eliminate 98% of microorganisms.

Figure 4A:
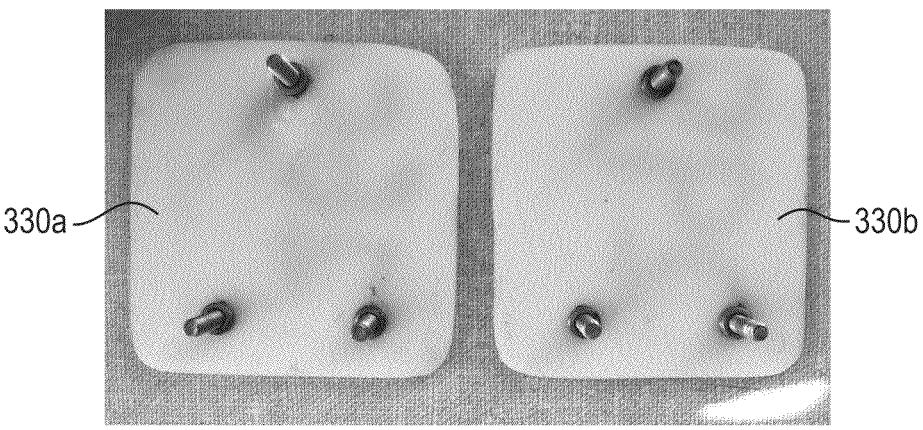
FIGS. 4A-4E are photographs of substrates subjected to different UV wavelengths over a period of time.
Figure 4B:
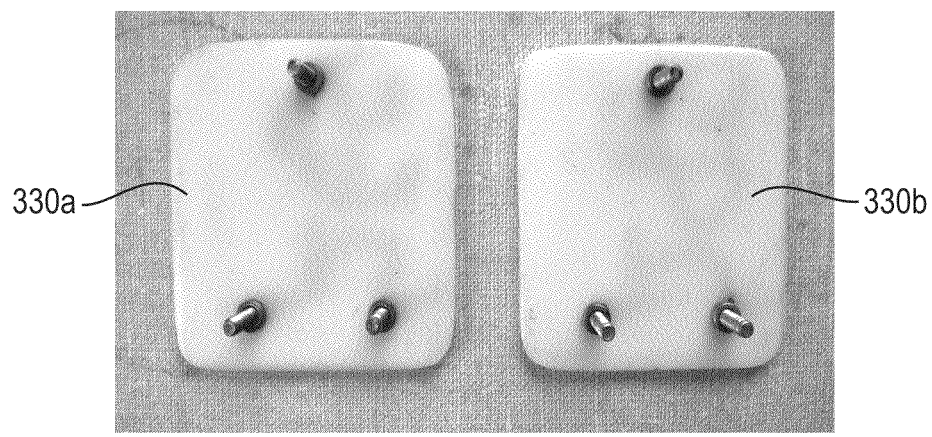
Figure 4C:
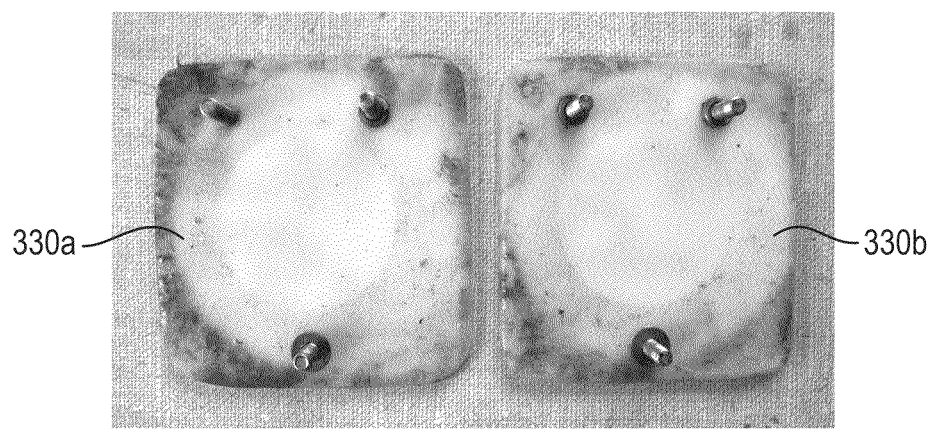
Figure 4D:
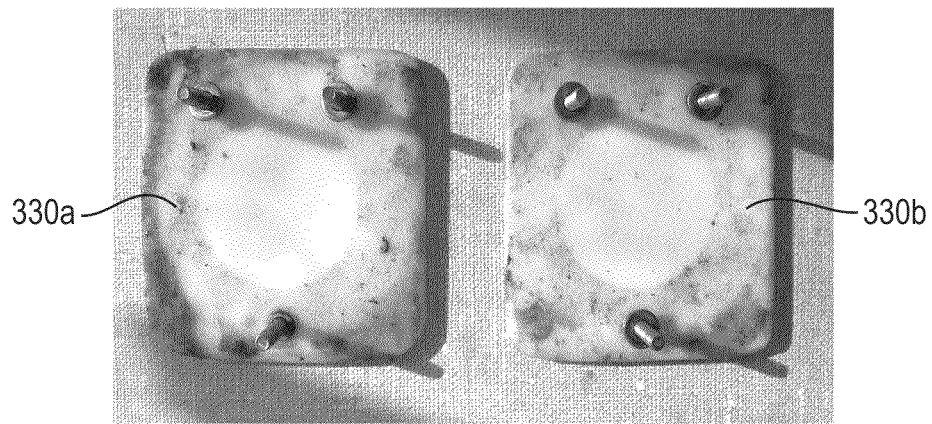
Figure 4E:
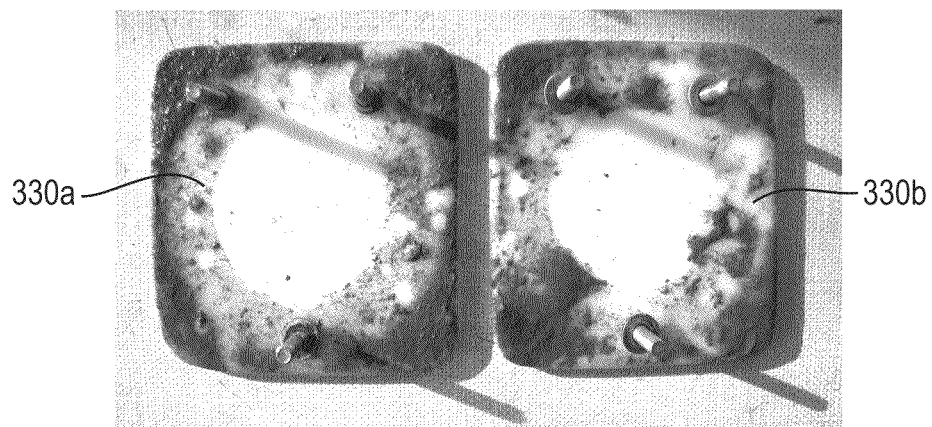

FIGS. 4A-4E represent the substrates 330a, 330b throughout the experiment. In each of FIGS. 4A-4E, the substrate 330a exposed to 265 nm is on the left and the substrate 330b exposed to 295 nm is on the right. FIG. 4A is a photograph taken on day 1 of the experiment, FIG. 4B on day 6, FIG. 4C on day 19, FIG. 4D on day 22, and FIG. 4E on day 33 (the final day).

Based on the results of this experiment, one 295 nm UV LED 308 appears to perform just as well or better than a 265 nm UV LED 308 on the same duty cycle, and is therefore more cost effective, as 265 nm LEDs 308 typically cost more than 295 nm LEDs 308 (e.g., $229 for 265 nm, $149 for 295 nm). Dosages of 265 nm UV for antifouling may start at 1.37 kJ/m$^2$, and for 295 nm UV may start at 2.29 KJ/m$^2$. These dosages may provide a starting point which a user may back off to a threshold dosage, or may be increased by a user to provide a safety factor in irradiation.

To properly ensure transmission of shortwave UV, a specialty UV transparent window 304 may be used. For wavelengths in the 250-300 nm range, quartz and fused-silica may be suitable material choices. If an internal cleaning system is desired to prevent fouling on a window 304, the window should be designed for such an application to ensure UV reaches the surface at risk of biofouling. Alternatively, the antifouling system may be external and self-contained. Consideration may also be given to the fact shortwave UV may be subject to high attenuation losses in typical ocean waters, which somewhat limits the distances from the LED to its target substrate for which the LED can be effective.

For this experiment, the shortest possible path length (approximately 1.7 cm) of UV through water was chosen to minimize attenuation losses. While the attenuation coefficients for this range of UV in the waters at the test location were not known, a worst-case scenario estimate with a theoretical coefficient of 0.36 showed that the attenuated dosage to the 265 nm substrate would have been 0.49 kJ/m$^2$ for the 80 min duty cycle. This may explain why the lower-duty cycles did not appear to be effective; the dosage required to kill 98% of microbes is 0.5 kJ/m$^2$. However, in a different environment, the lower-duty cycles may be sufficient.

The experiment results suggest that both 265 nm and 295 nm UV LEDs 308 may be effective for antifouling purposes. As 295 nm LEDs tend to be less expensive and equally effective, they may be a preferred choice for the tested duty cycle. It is expected that experimentation with different wavelengths may produce different results. For example, a threshold dosage determined by reducing the UV dosage until one wavelength outperforms the other may be tested at different frequencies to develop a more versatile system that administers less obtrusive, seconds-long dosages at a higher rate. A decrease in off time would allow for lower dosages, decreasing the time for biofilms to accumulate between doses.

Various embodiments and features of the present invention have been described in detail with particularity. The utilities thereof can be appreciated by those skilled in the art. It should be emphasized that the above-described embodiments of the present invention merely describe certain examples implementing the invention, including the best mode, in order to set forth a clear understanding of the principles of the invention. Numerous changes, variations, and modifications can be made to the embodiments described herein and the underlying concepts, without departing from the spirit and scope of the principles of the invention. All such variations and modifications are intended to be included within the scope of the present invention, as set forth herein. The scope of the present invention is to be defined by the claims, rather than limited by the forgoing description of various preferred and alternative embodiments. Accordingly, what is desired to be secured by Letters Patent is the invention as defined and differentiated in the claims, and all equivalents.

What is claimed is:

1. A system for reducing fouling of a surface of an optically transparent element subjected to a marine environment including a marine fluid, the system comprising:
   a plurality of mounts disposed about the surface of the optically transparent element and extending into the marine environment, each mount including an LED for emitting UV-C radiation through the marine fluid from a distal end of each mount, each mount angling its distal end inward and downward toward and proximate to the surface of the optically transparent element;
   wherein the surface of the optically transparent element is curved, wherein the optically transparent element allows for the transmission of light therethrough into a housing, and wherein the LED in each mount is disposed in a watertight enclosure that is separate from the housing; and
   control circuitry for driving the LED.

2. The system of claim 1, wherein the optically transparent element is selected from the group consisting of a window and a lens.

3. The system of claim 1, wherein the emitted UV-C radiation has a wavelength in a range of about 265 nm to about 295 nm.

4. The system of claim 1, wherein the watertight enclosure comprises a UV transparent port.

5. The system of claim 1, wherein the control circuitry, when activated, maintains a duty cycle of the LED of at least about 10%.

6. The system of claim 1, wherein an attenuated dosage reaching the surface is at least about 0.5 kJ/m$^2$.

7. The system of claim 1, wherein a kill efficiency at the surface is at least about 95%.

8. A method for reducing fouling of a surface of an optically transparent element subjected to a marine environment including a marine fluid, the method comprising the steps of:
providing a plurality of mounts disposed about the surface of the optically transparent element and extending into the marine environment, each mount including an LED for emitting UV-C radiation through the marine fluid from a distal end of each mount, each mount angling its distal end inward and downward toward and proximate to the surface of the optically transparent element;
wherein the surface of the optically transparent element is curved, wherein the optically transparent element allows for the transmission of light therethrough into a housing, and wherein the LED in each mount is disposed in a watertight enclosure that is separate from the housing;
driving each LED to emit UV-C radiation with a duty cycle of at least about 10% while the optically transparent element is subjected to the marine fluid; and
directing emitted UV-C radiation toward the optically transparent element.

9. The method of claim 8, wherein the optically transparent element is selected from the group consisting of a window and a lens.

10. The method of claim 8, wherein the emitted UV-C radiation has a wavelength in a range of about 265 nm to about 295 nm.

11. The method of claim 8, wherein the watertight enclosure comprises a UV transparent port.

12. The method of claim 8, wherein the optically transparent element comprises a UV transparent material.

13. The method of claim 8, wherein an attenuated dosage reaching the surface is at least about 0.5 kJ/m$^2$.

14. The method of claim 8, wherein a kill efficiency at the surface is at least about 95%.

* * * * *